METHOD AND APPARATUS FOR SELECTIVE ETCHING OF INSULATING LAYERS

Filed Nov. 13, 1968 2 Sheets-Sheet 1

WITNESSES

INVENTORS
Alan J. Simon, Joseph E. Johnson
and Terence W. O'Keeffe
BY
ATTORNEY

United States Patent Office 3,580,749

Patented May 25, 1971

3,580,749

METHOD AND APPARATUS FOR SELECTIVE ETCHING OF INSULATING LAYERS

Alan J. Simon, Trafford, and Joseph E. Johnson and Terence W. O'Keeffe, Pittsburgh, Pa., assignors to Westinghouse Electric Corporation, Pittsburgh, Pa.

Filed Nov. 13, 1968, Ser. No. 775,276
Int. Cl. H01l 7/00, 7/44
U.S. Cl. 148—187 11 Claims

ABSTRACT OF THE DISCLOSURE

In selective etching by the bombardment enhanced etching rate (BEER) effect, a metal layer on the bombardment insulator is used to provide increased etch enhancement. The metal layer also may serve as an electrode in biasing the structure to produce a beam induced current from which the applied dose is indicated.

ACKNOWLEDGMENT OF GOVERNMENT CONTRACT

The invention herein described was made in the course of or under a contract with the Department of the Air Force.

BACKGROUND OF THE INVENTION

Field of the invention

This invention is in the field of selective pattern formation of insulators particularly useful in microelectronic component fabrication.

Brief description of the prior art

The bombardment enhanced etch rate (BEER) effect and its applications have been described in copending application Ser. No. 640,164, filed May 22, 1967, by T. W. O'Keeffe and M. W. Larkin and assigned to the assignee of the present invention, and also in an article by T. W. O'Keeffe and R. M. Handy in Solid State Electronics, volume 11, pages 261 to 266 (1968) entitled "Fabrication of Planar Silicon Transistors Without Photoresist." Reference should be made to such descriptions for background to the present invention which is an improvement thereon.

Briefly, bombardment by damaging radiation, such as electrons, enhances the etching rate of insulating layers, such as silicon dioxide on silicon. Selective application of the bombardment permits the etching of windows in the insulating layer without the use of a mask of photoresist or the like.

Useful devices have been made by the (BEER) effect as previously disclosed. Such fabrication has often required exposure of the oxide coated sample to nearly one coulomb of electron charge per square centimeter to achieve saturation of the etch enhancement factor, that is, so that the etch enhancement factor over the entire bombarded surface is the same despite any incidental variation in the dose received by a very small area. Overexposure is undesirable in manufacturing because of the time required. Part of the problem is to accurately determine when the sample has reached saturation.

SUMMARY OF THE INVENTION

Among the objects and advantages of this invention is to provide a sample configuration which permits both a reduction in dose to achieve saturation of the bombardment enhanced etch rate as well as a simple technique for determining when saturation has been achieved.

It was initially contemplated that the employment of a metal layer on top of the insulating layer to be bombarded might be useful in measuring beam induced current to see if this current could be correlated with the enhancement ratio to determine when saturation has been reached. Quite unexpectedly, it was found that the metal layer, such as one of aluminum having a thickness in the range from about 300 A. to about 3000 A., was not only useful for the originally contemplated purpose but it also produced a greater etch enhancement effect, The operative procedures and apparatus employed in the practice of this invention are largely, with the exception of the metal layer overlying the bombarded insulating layer and its uses, as described in the above-mentioned copending application and article.

DESCRIPTION OF THE PREFERRED EMBODIMENTS

Although the invention has wider utility, it is of particular interest in the formation of windows in a layer of silicon dioxide occurring on the surface of silicon wafers in semiconductor processing for selectively diffused semiconductor devices and integrated circuits. For that reason the description will be particularly presented within that context although it is to be understood that generally pattern formation in insulating layers is within the scope of the invention.

Figure 1:
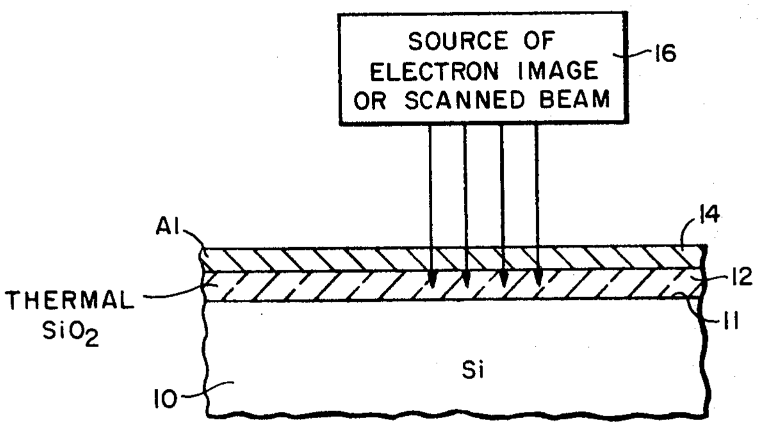
FIG. 1 is a partial sectional view of a structure with a schematically shown apparatus for treatment in accordance with the present invention.

In FIG. 1 is shown a body 10 of semiconductor material, such as silicon, having on its surface 11 a layer 12 of an insulator, such as thermal silicon dioxide, on which is disposed a layer 14 of metal, such as aluminum. The materials mentioned are by way of example only. Silicon nitride, for example, is also a suitable insulator.

Also shown in FIG. 1 is a source 16 of an image or a scanned beam of damaging radiation such as electrons to selectively bombard the sample structure and penetrate through the metal layer 14 into the insulator 12. When this occurs an effect, not fully understood, happens in that the portion of the insulating layer bombarded through the metal exhibits an etch enhancement ratio greater than that of similar structures bombarded without the metal layer.

As described in the copending application, the damaging radiation may be any that produces either ionization or atomic displacement damage. Electrons are preferred for convenience. The electron energy may suitably be in the range from about 1.0 kv. to about 2.5 kv. for each 1000 angstroms of thickness of the insulating layer 12.

Figure 2:
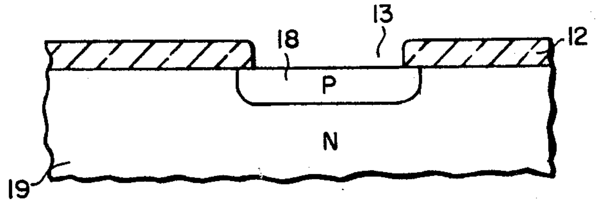
FIG. 2 illustrates the structure of FIG. 1 after further processing.

Referring to FIG. 2, the metal layer 14 has been removed such as by etching with an etchant that does not attack the insulator 12. The insulator has then been subjected to an etchant that by reason of the etch enhancement ratio of the bombarded area produces a window 13 in the bombarded area which may be used for selective diffusion of impurities such as acceptor impurities to produce a P-type region 18 in an N-type region 19. Additional steps including reoxidation and reopening of windows for successive diffusion steps and/or contacting to various regions may be performed in the same manner or by other known techniques.

Figure 3:
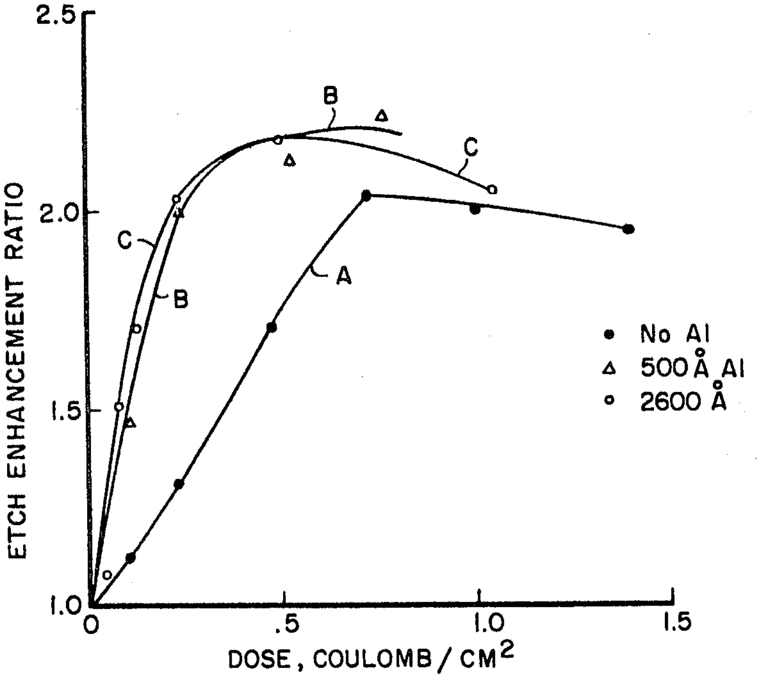
FIG. 3 is a set of curves explanatory of the results of FIGS. 1 and 2.

FIG. 3 shows the quantitative nature of the effect employed in the present invention. The indicated results are typical of a number of experiments. The etch enhancement ratio is the ratio of the etching rate of the bombarded insulator to the etching rate of unbombarded insulator, other conditions being the same. Curve A illustrates this ratio for samples receiving various doses of 10 kv. electrons that had no aluminum on the insulator, which in all cases was 5000 A. thick of thermal $SiO_2$ prepared by the conventionally employed dry-wet-dry oxidation technique, although steam or dry oxidation may be used with essentially similar results. Curve B illustrates the etch enhancement ratio of various samples subjected to different doses of 10 kv. electrons that had 500 A. of aluminum on the insulator surface. Similarly, curve C illustrates the results in the case of samples which had 2600 A. of aluminum on the insulator surface. In all cases the bombardment was performed with the samples maintained at 100° C. The similarity betwen curves B and C establishes the relative non-criticality of the metal layer thickness.

Two significant things about these results are that for the aluminized samples in all cases the etch enhancement ratio is higher than that for the non-aluminized samples with equal electron dose and also that in the case of the aluminized sample saturation, that is a leveling off of the etch enhancement ratio, is reached at a lower dose. A reduction of about 50% in the dose required for saturation is typical of the results of the use of a metal layer on the insulator. The insulator layer thickness on which the invention may be practiced is non-critical and covers useful ranges of silicon dioxide thickness, such as 1000 A. to 15,000 A., employed in semiconductor devices and integrated circuit fabrication.

An explanation for the effect of the metal layer is not available at this time. While though to have something to do with the rate of cooling of the insulator surface, this does not account for the magnitude of the effect. It can be stated however that the effect on the aluminized samples at room temperature is approximately the same as a non-aluminized sample at liquid nitrogen temperature. As originally reported in the above copending application, heating is deleterious to the etch enhancement effect.

By way of further example, more detailed explanation of the preparation and testing of samples for the data of FIG. 3 will be given. A large number of silicon samples, of normal commercial device quality material, without particular regard to conductivity type or resistivity, were cleaned and subjected to the same oxidation treatment to produce a layer of about 5000 A. of thermal silicon dioxide on each. Some of the samples were not aluminized. Others were aluminized to thicknesses of 500 A. and 2600 A. employing vacuum evaporation techniques. Each of the samples was then uniformly bombarded for an arbitrary time to provide a given dose at the surface, calculated from the current of the flood open electron source and sample surface area. With the experimental electron flood gun apparatus employed the current was about 10 microamperes (or 220 microamperes per square cm. current density) and for maximum doses in the range of 1 to 1.5 coulombs per square centimeter exposure for about 80 minutes was necessary. During the bombardment of each of the samples a portion of the surface was shielded to provide during subsequent etching a comparison between bombarded and unbombarded areas.

After bombardment the aluminum was removed employing an etchant of 10% sodium hydroxide in water at room temperature. Such an etchant is effective to remove the aluminum layers within about 10 to 15 seconds and has a very slow effect on silicon dioxide.

After removal of the aluminum the oxide was subjected to an etchant known as the 6P etch including 13.7 percent concentrated nitric acid and 20 percent concentrated hydrofluoric acid in water. The etch was performed for limited time periods after which by well known color comparison techniques the oxide thickness was determined so as to give the ratio between the bombarded and unbombarded areas. The etching rate for all samples was essentially linear.

FIG. 1 illustrates a preferred form of the invention in which the sample is uniformly coated with metal and subjected to an electron image or selectively scanned beam. The image may result from a masked photocathode, a flood gun passing through a mask or other sources of which some are described in the copending application. It is also feasible, although not preferred because of extra processing required, to form the aluminum in a pattern as by evaporation through a mask or development with photolithographic techniques. Such a patterned surface could be uniformly bombarded with electrons and the difference in etch rate employed to provide windows.

Figure 4:
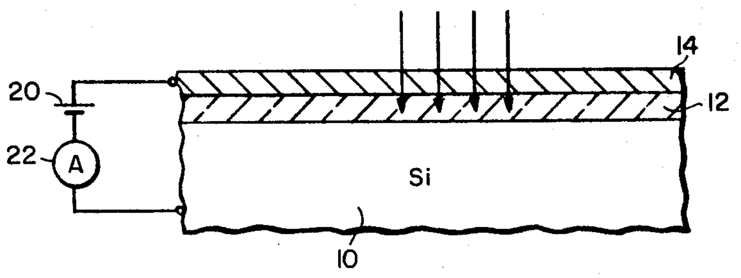
FIG. 4 is a partial sectional view of a structure with other features of the present invention.

FIG. 4 illustrates the basic structure of FIG. 1 with a bias voltage source 20 and ammeter 22 connected across the metal and semiconductor layers 14 and 10. This is for the purpose of monitoring the current through the structure that is found to be indicative of the etch enhancement ratio and hence can serve to indicate when the structure has been saturated so that it is known that etch rate will be uniform in all the bombarded areas. The applied bias voltage should not exceed the breakdown voltage of the insulating layer. Typically it may be in the range of 20 to 150 volts for about 10,000 A. of silicon dioxide. The polarity of the bias voltage is not critical although it is found that somewhat less heating results with the polarity as indicated when the metal is connected to the positive pole. If a bias voltage is continuously applied to a sample it has a deleterious result on etch enhancement presumably because of thermal considerations. In employing the bias voltage for monitoring purposes it should only be applied at intervals in the process for momentary measurement and then disconnected.

When a bias voltage is applied during bombardment it is found that at first considerable increase in current is observed compared with that found in the absence of bombarding radiation. This is the well known electron bombardment induced conductance (EBIC). As radiation proceeds, the induced conductance steadily decreases in a manner closely similar to the increase in etch enhancement ratio.

Figure 5:
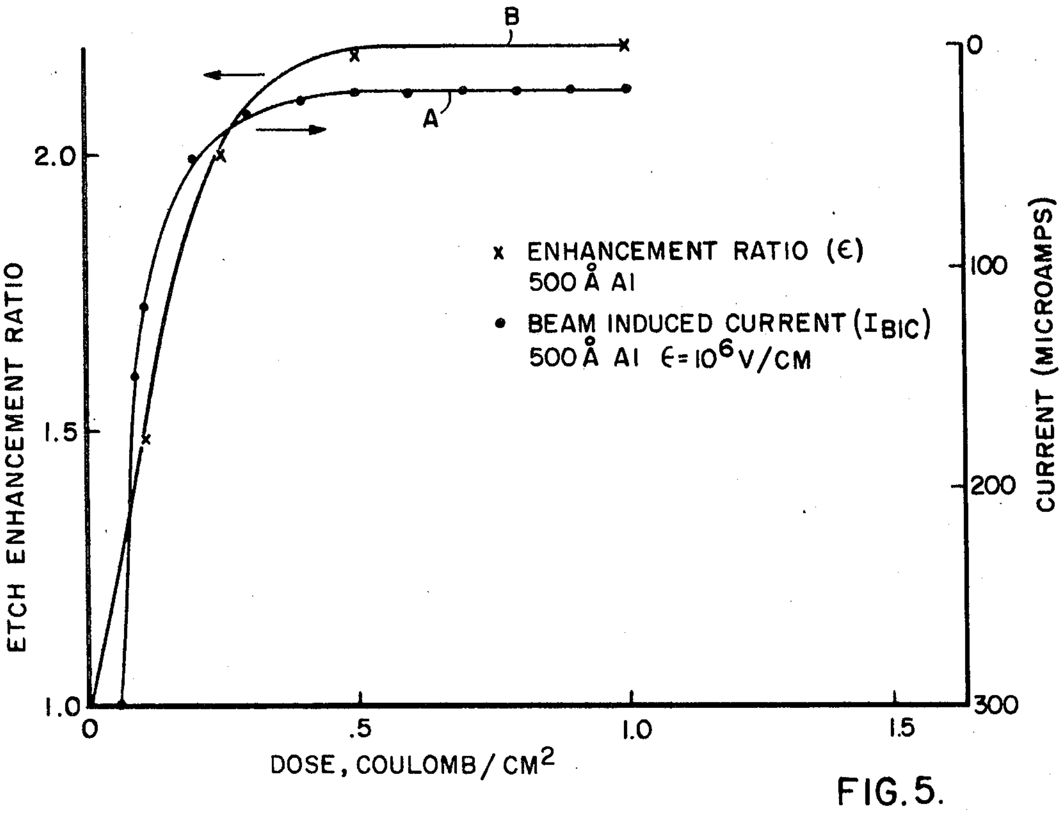
FIG. 5 is a set of curves explanatory of FIG. 4.

FIG. 5 illustrates results with samples which had 500 A. of aluminum on 5000 A. of silicon dioxide on a substrate of 1 ohm centimeter N-type silicon. Current was measured with an applied electric field of about $10^6$ volts per centimeter. The beam induced current during bombardment, curve A, has a close relationship to the etch enhancement ratio, curve B. A beam induced current that had dropped down to a level of about 25 microamperes meant saturation had been reached. This is highly useful because any variation in the electron beam source such as resulting from age of a photocathode, or replacement of a thermionic cathode filament, would not otherwise be easily taken account of in ascertaining the required length of time for the desired dose.

While the present invention has been shown and described in a few forms only it will be apparent that various changes and modifications may be made without departing from the spirit and scope thereof.

What is claimed is:

1. In a method of forming openings within a layer of insulating material on a substrate, the combination of steps comprising:

applying a metal layer on said insulating layer;

bombarding the surface of said metal layer with damaging radiation penetrating through said metal layer into said insulating layer;

removing said metal layer; and etching said insulator to produce at least one opening where bombarded.

2. The subject matter of claim 1 wherein said substrate is a body of semiconductive material.

3. The subject matter of claim 2 wherein: said substrate is a body of silicon and said insulating layer is at least one member selected from the group consisting of silicon dioxide and silicon nitride.

4. The subject matter of claim 3 wherein: said insulating layer is of silicon dioxide formed by thermal oxidation of said substrate.

5. The subject matter of claim 4 wherein: said metal layer is of aluminum having a thickness in the range of from about 300 angstroms to about 3000 angstroms.

6. The subject matter of claim 1 wherein: said damaging radiation is electrons.

7. The subject matter of claim 5 wherein: said damaging radiation is electrons accelerated to an energy of from about 1.0 kv. to about 2.5 kv. for each 1000 angstroms of thickness of said insulating layer.

8. The subject matter of claim 1 further comprising: during said bombarding, applying a bias voltage across said metal layer and said substrate and measuring current therebetween.

9. The subject matter of claim 8 further comprising: terminating said bombardment when said current has reached a minimum value.

10. The subject matter of claim 8 wherein: said steps of applying a bias voltage and measuring current are performed for limited times at spaced intervals during said step of bombarding.

11. The subject matter of claim 4 further comprising: after said etching step, diffusing an impurity through said opening into said substrate to convert the conductivity type of a portion thereof.

References Cited

UNITED STATES PATENTS

| | | | |
|---|---|---|---|
| 2,907,704 | 10/1959 | Trump | 250—49.5(7)X |
| 3,431,150 | 3/1969 | Dolan | 148—1.5 |

JAMES W. LAWRENCE, Primary Examiner

A. L. BIRCH, Assistant Examiner

U.S. Cl. X.R.

29—25.3; 148—1.5; 250—49.5